United States Patent [19]  
Caers et al.

[11] Patent Number: 4,782,209  
[45] Date of Patent: Nov. 1, 1988

[54] INTERCONNECTING A GLASS OR CERAMIC ELEMENT AND A METAL ELEMENT

[75] Inventors: Johan F. J. M. Caers; Joseph A. Meertens; Johannes N. J. M. Van den Reek, all of Eindhoven, Netherlands

[73] Assignee: U.S. Philips Corporation, New York, N.Y.

[21] Appl. No.: 86,435

[22] Filed: Aug. 17, 1987

[30] Foreign Application Priority Data

Aug. 18, 1986 [GB] United Kingdom ............... 8620057

[51] Int. Cl.⁴ .............................................. B23K 26/00
[52] U.S. Cl. ............................................... 219/121.64
[58] Field of Search ................ 219/121 LC, 121 LD, 219/121 L, 121 LM

[56] References Cited

U.S. PATENT DOCUMENTS 3,585,350  6/1971  Voytko ................... 219/121 LD X  
3,614,832 10/1971  Chance et al. .......... 219/121 LD X  
3,934,073  1/1976  Ardezzone ............... 219/121 LC  
4,224,435 12/1980  Barnes, Jr. ............. 219/121 LD  
4,281,236  7/1981  Von Allmen et al. ..... 219/121 LC  
4,534,811  8/1985  Ainslie et al. ......... 219/121 LC X Primary Examiner—C. L. Albritton  
Attorney, Agent, or Firm—Norman N. Spain

[57] ABSTRACT

A method of interconnecting a first element 1 and a second element 4 by means of laser welding, the first element 1 consisting at least partly of glass or ceramics and the second element 4 consisting at least partly of metal, the bond between both elements being formed by the glass or ceramic part of the first element 1 and the metal part of the second element 4, characterized in that a metal auxiliary element 3 is bonded to the glass or ceramic part of the first element 1 by means of a solid-state bond 2, after which, substantially without heating, the metal part of the second element 4 is welded to the metal auxiliary element 3 by means of a laser beam 5.

10 Claims, 4 Drawing Sheets

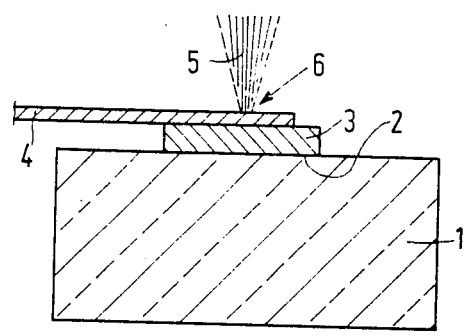
FIG.1A
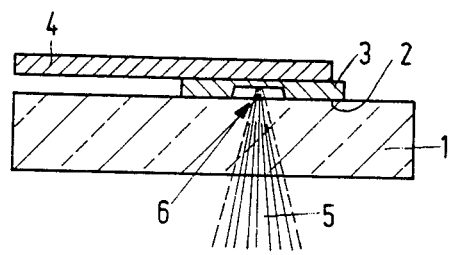
FIG.1B
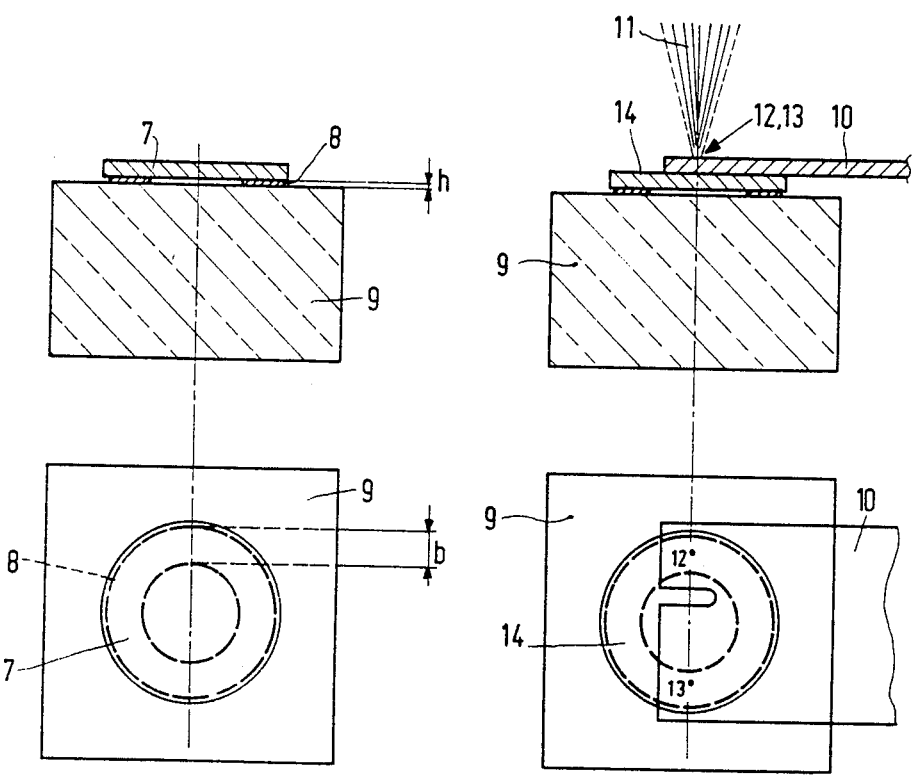
FIG.2A
FIG.2B

INTERCONNECTING A GLASS OR CERAMIC ELEMENT AND A METAL ELEMENT

BACKGROUND OF THE INVENTION

The invention relates to a method of interconnecting a first and a second element by means of laser welding, the first element consisting at least partly of glass or ceramics, and the second element consisting at least partly of metal, the bond between both elements being formed by the glass or ceramic part of the first element and the metal part of the second element. Such a method may be used, for example, in the manufacture of optical equipment, vacuum tubes and picture tubes.

A method of the type described opening paragraph is known from GB No. 1228451. In that specification a description is given of a method in which a glass element or glass elements is or are laser welded to a metal element, both elements are heated to a temperature just below the softening temperature of the glass. By means of a laser beam which is focussed on the metal element at the location of the bond to be made the temperatures of the metal element and, through this element, of the glass element are raised at the location of the laser spot. This causes the glass to soften after which the bond is formed. By way of example, GB No. 1228451 describes the securing of an electrode grid in a picture tube. A disadvantage of this method is that both elements have to be heated to a high temperature and that the method has to be carried out in a furnace. One or both of the elements, or a part or parts of one or both elements, for example optical or electronic components, may become damaged by these high temperatures. During cooling of the bond differences formed in the coefficients of thermal expansion may lead to thermal stresses which may have detrimental effects. The relative positions of accurately bonded elements may change in the cooling process due to these differences in the coefficients of thermal expansion. After the elements have cooled, these positions may change with time owing to stresses present in both elements, which stresses are caused by differences in the coefficients of thermal expansion. Since the glass softens at the location of the bond during the laser welding process, it is difficult to form a bond having a high dimensional accuracy.

SUMMARY OF THE INVENTION

It is an object of the invention to bond a glass or ceramic part to a metal part by means of laser welding substantially without heating the parts and without softening the glass at the location of the bond during the laser welding process.

This object is achieved by a method according to the invention, which is characterized in that a metal auxiliary element is bonded to the glass or ceramic part of the first element by means of a solid-state bond, after which, substantially without heating, the metal part of the second element is welded to the metal auxiliary element of the first element by means of a laser beam.

An important aspect of the invention is that the method enables dimensionally accurate glass-metal bonds to be made in a readily conceivable and quick way. Since during the formation of the bond no forces are exerted on the bond, and no parts or elements have to be heated there are no thermal or mechanical stresses which directly or with time could lead to a change in the relative position of the elements and, consequently, to a reduction of the dimensional accuracy.

In order to interconnect both elements with great dimensional accuracy, the metal auxiliary element must be bonded to the glass or ceramic part of the first element with great dimensional accuracy, and the dimensional accuracy and strength of the bond between the metal auxiliary element and the glass or ceramic part of said first element must not be adversely affected by the laser weld between the metal auxiliary element and said second element. The dimensional accuracy of the bond between the metal auxiliary element and the glass or ceramic part of the first element is determined by the initial dimensional accuracy, i.e. the accuracy with which the parts are interconnected, and above all by the temporal dimensional accuracy, i.e. the accuracy with which the parts remain interconnected after the bond has been formed. Particularly the temporal dimensional accuracy is influenced by the way in which the bond has been formed.

Glass-metal bonds are used on a large scale in products for the electronics industry and in vacuum equipment. These bonds are generally formed at a high temperature at which the softened glass is brought into contact with the metal. These techniques are referred to here as high temperature sealing techniques. However, due to the deformation of the glass at the high bonding temperature it is generally impossible to make dimensionally accurate bonds between the metal auxiliary element and the glass or ceramic part of the first element by means of high temperature sealing techniques. Dimensionally accurate bonds can be obtained when techniques are used in which the glass part and the metal auxiliary element and any intermediate layers, the function of which will be explained hereinafter, are in the solid state during the formation of the bond, at a temperature which is considerably below the melting temperature or the softening temperature of the glass, the metal or the intermediate layer, so-called solid-state bonds, which bonding techniques are also more readily conceivable than high temperature sealing techniques. Experiments have shown that the dimensional accuracy and the strength of the bond between the glass part and the metal auxiliary element is not adversely affected by the laser weld.

An embodiment of the method according to the invention is characterized in that the laser beam traverses the glass or ceramic part to form the weld. Thus, it becomes possible to laser weld the metal part of the second element to the metal auxiliary element of the first element without heating either of them and without softening the glass or the ceramics, even when the metal part is so thick that it cannot be penetrated by the laser beam or when the metal part consists of a metal with a high reflection or when the laser beam cannot be focussed on the metal part because objects are present around the bonding area.

A further embodiment of the method according to the invention is characterized in that the metal auxiliary element is bonded to the glass or ceramic part by means of thermocompression. This is a clean, fast and efficient method of bonding a metal auxiliary element to a glass part.

A further embodiment of the method according to the invention is characterized in that the metal auxiliary element is bonded to the glasss or ceramic part at a raised temperature by means of an electric field. This method of bonding a metal auxiliary element to a glass or ceramic part is carried out at a pressure or temperature which is lower than in the case of thermocompression. This method can suitably be used when the temperature or the pressure is to be lower than the pressure or temperature necessary for thermocompression, for example to avoid damage to an element or a part. This method also allows metal auxiliary elements, which cannot be bonded to a glass part by means of thermocompression because the temperature required is higher than the softening temperature of the glass, to be bonded to the glass at temperatures below the softening temperature.

A still further embodiment of the method according to the invention is characterized in that the metal auxiliary element is bonded to the glass or ceramic part by ultrasonic welding using an aluminium intermediate layer which is present between the glass part and the metal auxiliary element. Ultrasonic welding is carried out at room temperature and, hence, is suitable for applications in which parts of the first element may be damaged by raised temperatures.

BRIEF DESCRIPTION OF THE DRAWINGS

In the drawing FIG. 1a and FIG. 1b each illustrate the method of the invention through sectional views of a bond formed according to the method of the invention;

FIG. 2a is a sectional view and a top view of a bond between a metal auxiliary element and a ceramic or glass part, which is obtained by thermocompression;

FIG. 2b is a sectional view, and a top view of a bond between a metal and part and a metal auxiliary element obtained by use of a laser beam;

FIG. 7b shows a detail of FIG. 7a;

DETAILED DESCRIPTION OF THE INVENTION

Figure 3:
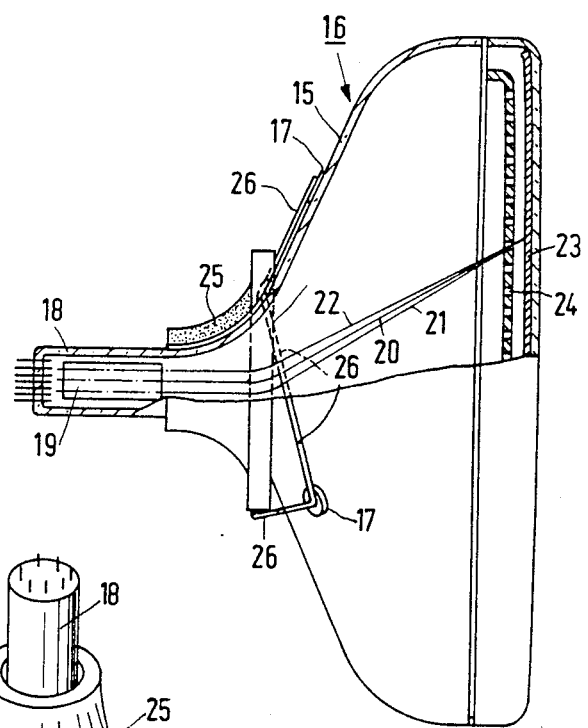
FIG. 3 is a sectional view of a picture tube to which a deflection unit is secured.

The invention will now be described in greater detail with reference to the drawing.

In the Figures, corresponding elements have been given the same reference numerals.

FIGS. 1a and 1b show the method according to the invention. A metal auxiliary element 3 is bonded to a glass or ceramic part 1 by means of a solid-state bond 2. A metal part 4 is provided on this auxiliary element. When the desired relative position is obtained a laser beam 5 forms a weld 6, thus, instantaneously bonding the metal part 4 to the glass or ceramic part 1, without heating except at the location and in the immediate vicinity of the laser weld any of these parts or exerting forces on them. For this reason, the dimensional accuracy of the bond is not adversely affected by thermal or mechanical stresses. Consequently, this bonding method can suitably be used for applications requiring a high dimensional accuracy. FIG. 1b differs from FIG. 1a in that in the former the laser beam 5 traverses the glass or ceramic part to form a laser weld 6. Of course, in such a case the glass or ceramic part 1 must be transparent to the laser beam. Such an arrangement may be necessary, for example, if the metal part 4 is so thick that it cannot be penetrated by the laser beam 5 or when the metal part 4 consists of a highreflection metal or when the laser beam 5 cannot be focussed on the location indicated in FIG. 1a because there are objects present around the bonding area. When the method is employed in such a manner, too high temperatures in the glass or ceramic part 1, which may lead to softening of the glass or the ceramics, and/or to thermal stresses in the glass or the ceramics, and consequently to a possible reduction of the dimensional accuracy are to be avoided. When the method is employed in such a manner, the metal auxiliary element 3 may be provided with a part which is spatially separated from the part 1 shown in, for example, FIG. 1b in order to avoid too high temperatures. The relative position and orientation of the glass part 1, the metal auxiliary element 3, the metal part 4 and the laser beam 5 are, of course, in no way limited to the examples given in the FIGS. 1a and 1b. It is possible, for example, that the lower and the upper surface of the metal auxiliary element 3 do not be parallel to each other or that the laser beam 5 is not oriented perpendicularly to the surfaces of the metal auxiliary element 3 or the metal part 4.

FIG. 2a is a sectional view and a top view of a metal auxiliary element 7 which is bonded to a glass or ceramic part 9 by means of thermocompression using an intermediate layer 8. In the present example the intermediate layer is ring-shaped. This ring has a height h and a width b. In order to obtain a bond the ring has to be deformed. Thermocompression is a method in which the metal of the intermediate element 8 is deformed in contact with the glass or the ceramics at a raised temperature which is, however, substantially below the softening temperature of the glass or the ceramics. In the present example the bonding temperature $T_b$ is related to the melting temperature $T_m$ of the metal of the intermediate element, such that $T_b$ is approximately equal to 0.9 $T_m$. The commonly used industrial glass types have their softening point at approximately 400° to 600° C. (quartz and quartz-like glasses have higher softening points), consequently the relatively low-melting metals aluminium, lead and indium and alloys thereof, are generally used to form bonds between metals and these types of glass. When aluminum is used the bonding temperature is approximately 550° C. For bonds to ceramic materials also other metals such as, for example Pt, Fe, Ni and Cu can be used. This method is described, among others, in American Ceramics Society Bulletin, Volume 51, No. 9, page 683 (1972).

FIG. 2b shows a metal part 10 which is bonded to a metal auxiliary element 14 at the locations 12 and 13 by means of a laser beam 11. This drawing shows a test bond which is used to investigate the influence of laser welding on the strength of the thermocompressed bond. Experiments have shown that the strength and the dimensional accuracy of the thermocompressed bond are not adversely affected by the laser weld.

FIGS. 3, 4, 5 and 6 show an application of an embodiment of the method according to the invention. More in particular, they show how a deflection unit is secured to a picture tube.

Figure 4:
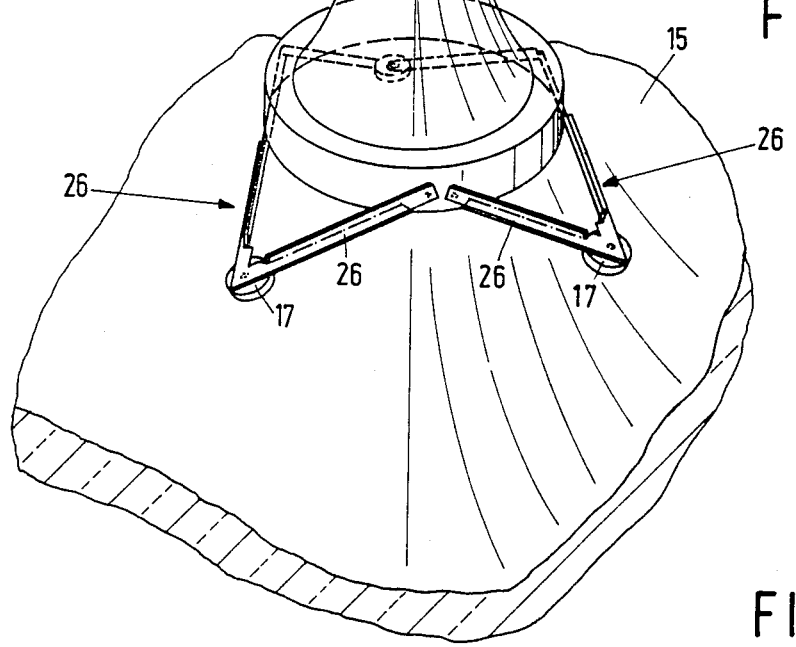
FIG. 4 is a prespective view of the picture tube of FIG. 3 to which a deflection unit is secured.
Figure 5:
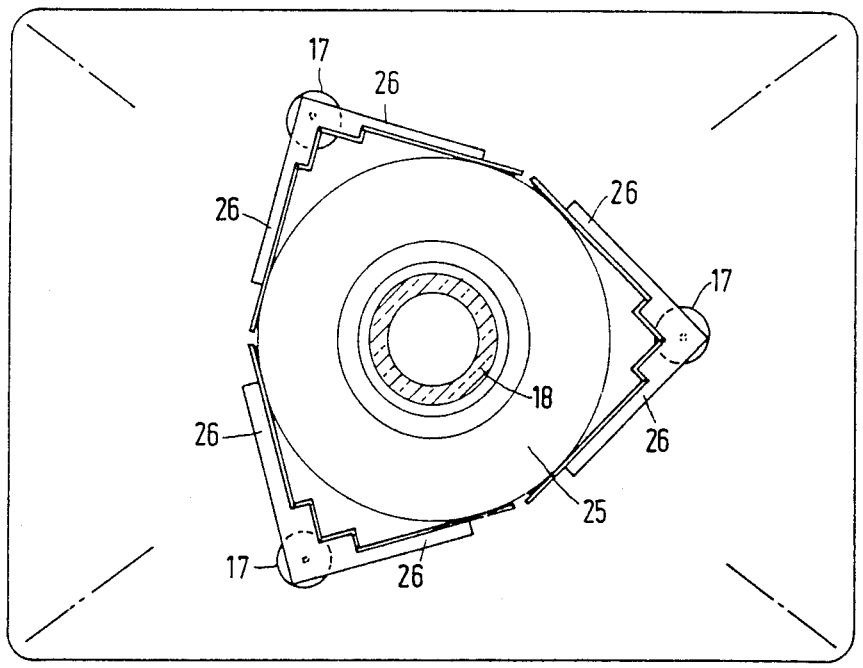
FIG. 5 is top view of the picture tube of FIG. 3 to which a deflection unit is secured.
Figure 6:
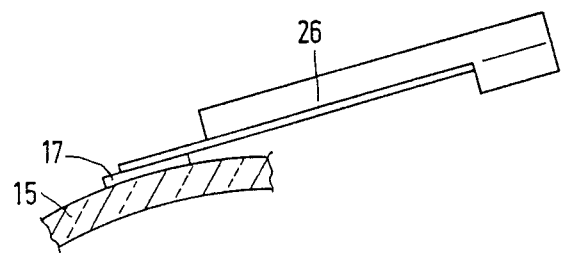
FIG. 6 shows in detail the bond between the deflection unit and the picture tube of FIG. 3.

FIG. 3 is a sectional view of a picture tube to which a deflection unit is secured. FIG. 4 is a perspective view of a picture tube to which a deflection unit is secured. FIG. 5 is a top view of a picture tube to which a deflection unit is secured. FIG. 6 is a detailed view of the bond between the deflection unit and the picture tube.

By means of thermocompression small metal plates 17 are bonded to the cone 15 of the picture tube 16, during cooling immediately after the pressing of the cone. Experiments have shown that these bonds are not adversely affected by heat treatments in subsequent assembly processes. In the neck 18 of the picture tube there is provided an electron gun 19 of the in-line type, which generates electron beams 20, 21 and 22. The electron beams 20, 21 and 22 are deflected across a screen 23 and a shadow mask 24 by a deflection unit 25. The construction of the deflection unit depends upon the shape and the function of the picture tube. The deflection unit 25 is provided with metal brackets 26. This deflection unit 25 is positioned relative to the electron gun 9 such that a test pattern is substantially optimally displayed on the screen 23. When this optimum position is obtained the deflection unit 25 must be secured permanently to the picture tube 16. To this end the brackets 26 are laser welded to the metal auxiliary elements 17. The metal auxiliary elements consist of a non-magnetic material having a coefficient of thermal expansion which equals to the extent possible that of the glass of the cone. The positions of the metal auxiliary elements and the shape of the brackets are selected so that the influence of fluctuations in temperature on the relative positions of the deflection unit and the picture screen is almost minimal. The joint between the bracket 26 and the metal auxiliary element 17, which is bonded to the cone 15, is shown in detail in FIG. 6. The metal auxiliary element 17 is accurately bonded to the cone 15 by thermocompression. Thus, a well-defined contact between the metal auxiliary element and the bracket 26 is obtained, thereby enabling the bracket 26 to be secured to the picture tube 16 with a very high dimensional accuracy after obtaining a substantially optimum display of a test pattern on the screen 23. This is a readily conceivable, quick and clean way of securing the deflection coil to the picture tube with a very high dimensional accuracy. Since no forces are exerted on the bond between the deflection coil and the picture tube and none of the elements has to be heated, no thermal or mechanical stresses develop which could lead to a change in the relative position of both elements and, consequently, to a loss of accuracy and to a reduction of the quality of the picture after interconnecting both elements.

It is also possible to bond the metal auxiliary element to the glass or ceramic part by means of an electric field at a raised temperature. This method is described, amongst others, in the Journal of Applied Physics, Volume 40, No. 10, page 3946 (1969). This method of bonding a metal auxiliary element to a glass or ceramic part is carried out at a temperature or pressure which is lower than in the case of thermocompression. Consequently, this method can suitably be used when the temperature or the pressure are to be kept below the pressure or temperature necessary for thermocompression; however, it must be possible to raise them. By means of this method, metal auxiliary elements which cannot be bonded to a glass part by thermocompression because the required temperature is higher than the softening temperature of the glass can be bonded to the glass at temperatures below the softening temperature of the glass. This method allows, for example, the bonding of certain types of steel, amongst others, Vacon-12 to glass, and to bond Al to glass at temperatures as low as 200°–250° C.

Thermocompression and bonding a metal auxiliary element to a glass or ceramic part by means of an electric field are carried out at raised temperatures. These methods of bonding a metal auxiliary element to the glass or ceramic part are unsuitable if the temperature cannot be raised or only to a very limited extent. If, for example, a metal auxiliary element is to be bonded to as lens provided with an optical coating, the bonding temperature is limited to approximately 80° C. because higher temperatures cause damage to the coating. In such a case, ultrasonic welding, which is carried out at room temperature, is a suitable method of bonding a metal auxiliary element to the lens. It is known to bond an aluminum element to glass by means of ultrasonic welding. However, aluminum is less suitable for laser welding because it has a high coefficient of reflection.

It has been found that several metal auxiliary elements which can suitably be laser welded, and which due to the required pressure cannot be bonded directly to glass by means of ultrasonic welding, can be bonded to glass via an aluminum intermediate layer by means of ultrasonic welding. This intermediate layer may consist of, for example, a foil. This intermediate layer may also consist of a layer which is provided on the metal auxiliary element, for example by vacuum evaporation.

Figure 7A:
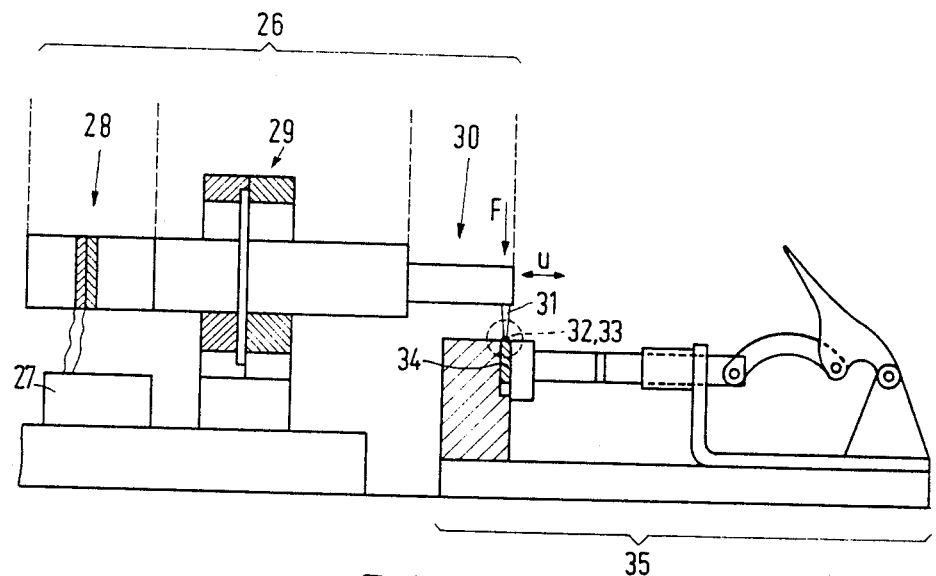
FIG. 7a is a sectional view of an ultrasonic welding arrangement employed in carrying out an embodiment of the invention.

FIG. 7a is a sectional view of an ultrasonic welding arrangement. The welding tip 31 of the ultrasonic wedding device 26 consisting of an ultrasonic generator 27, a transducer 28, a waveguide 29, an amplitude amplifier 30 and the welding tip 31, exerts a force F on a metal auxiliary element 32, in the present example Ni, and on an aluminium foil 33. This auxiliary element 32 and the foil 33 are provided on a glass part 34 which is held in a clamp 35. When the ultrasonic device 26 is put into operation an ultrasonic vibration having an amplitude u is transferred to the welding tip 31 and via this tip to the auxiliary element 32 and the foil 33, thereby forming an ultrasonic weld between the auxiliary element 32 and the glass part 34. The strength of the bonds thus obtained can be compared with that of the bonds obtained by thermocompression.

Figure 7B:
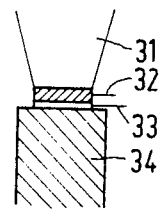

FIG. 7b is a detailed view of the welding tip 31, the metal auxiliary element 32, the aluminium foil 33 and the glass part 34.

Figure 8B:
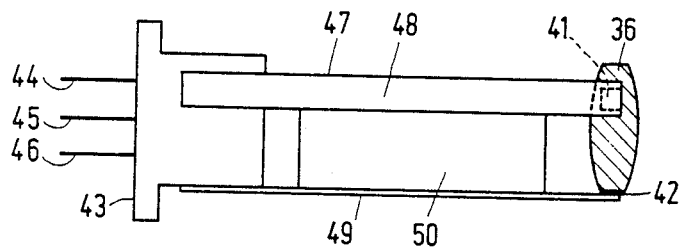
FIG. 8b shows in a side view how this lens is secured to a solid-state laser.
Figure 8A:
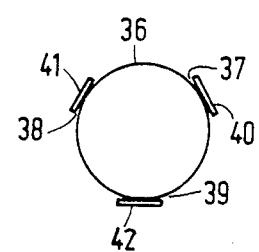
FIG. 8a is a sectional view of a lens provided with Ni elements which are bonded to the lens by means of ultrasonic welding.

FIG. 8a is a top view of a lens 36 which in three places 37, 38 and 39 on the periphery is provided with Ni elements 40, 41 and 42, which by means of ultrasonic welding, using Al foil as a welding material, is bonded to the lens. In this example experiments have shown that in order to obtain a proper bond the thickness of the Al foil is to be selected between 10 and 125 $\mu$m. The reason for this probably being that the force F to be exerted is too large for a thickness smaller than 10 $\mu$m, whereas in the case of a thickness larger than 125 $\mu$m the ultrasonic vibration is attenuated too much. A substantially optimum strength of the bond is obtained at a thickness of 25 $\mu$m.

FIG. 8b is a side view of a solid-state laser 43 having electric terminals 44, 45 and 46. The laser is provided with three tags 47, 48 and 49 which are interconnected by a sleeve 50. The lens 36 is positioned relative to the solid-state laser 43, such that the laser operates as optimally as possible, after which the tags 47, 48 and 49 are laser welded to the Ni elements 40, 41 and 42. In this way the lens is bonded to the solid-state laser with a very high dimensional accuracy. It will be clear that this is possible because the Ni auxiliary elements 40, 41 and 42 are accurately bonded to the lens 36. In this example and also for any other use of the method for optical equipment, it is not only important that, as described hereinbefore, thermal or mechanical stresses are absent, but also that laser welding is a clean welding method. Optical auxiliary elements are often sensitive to impurities in the air, for example vapours from aggressive substances which are produced in other welding methods.

It will be clear that the use of the inventive method of bonding a metal part to a glass or ceramic part is in no way limited to the descriptions given herein.

What is claimed is:

1. A method of interconnecting a first and a second element by means of laser welding, the first element consisting at least partly of glass and the second element consisting at least partly of metal, the bond between both elements being formed by the glass part of the first element and the metal part of the second element, characterized in that a metal auxiliary element is bonded to the glass part of the first element by means of a solid-state bond, after which substantially without heating, the metal part of the second element is welded to the metal auxiliary element by means of a laser beam.

2. A method as claimed in claim 1, characterized in that the laser beam traverses the glass part to form the weld.

3. A method as claimed in claim 1, characterized in that the metal auxiliary element is bonded to the glass part by means of thermocompression.

4. A method as claimed in claim 1, characterized in that the metal auxiliary element is bonded to the glass part by means of an electric field at a raised temperature.

5. A method as claimed in claim 1, characterized in that the metal auxiliary element is bonded to the glass part by ultrasonic welding, use being made of an aluminum foil which is provided between the element and the part to be bonded.

6. A method of interconnecting a first and a second element by means of laser welding, the first element consisting at least partly of ceramic and the second element consisting at least partly of metal, and bond between both elements being formed by the ceramic part of the first element and the metal part of the second element, characterized in that a metal auxiliary element is bonded to the ceramic part of the first element by means of a solid-state bond, after which, substantially without heating, the metal part of the second element is welded to the metal auxiliary element by means of a laser beam.

7. A method as claimed in claim 6, characterized in that the laser beam traverses the ceramic part to form the weld.

8. A method as claimed in claim 6, characterized in that the metal auxiliary element is bonded to the ceramic part by means of thermocompression.

9. A method as claimed in claim 6, characterized in that the metal auxiliary element is bonded to the ceramic part by means of an electric field at a raised termperature.

10. A method as claimed in claim 6, characterized in that the metal auxiliary element is bonded to the ceramic part by ultrasonic welding, use being made of an aluminum foil which is provided between the element and the part to be bonded.

* * * * *